Figure 1:
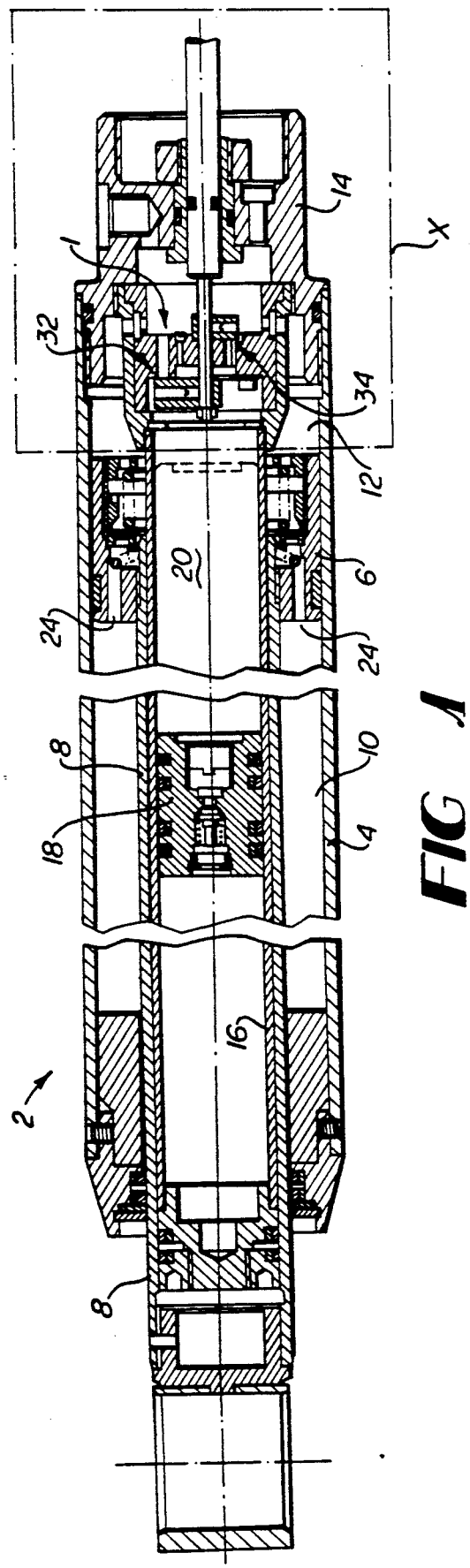

United States Patent [19]
Runkel

[11] Patent Number: 5,146,948
[45] Date of Patent: Sep. 15, 1992

[54] DAMPING VALVE WITH IMPROVED DAMPING ADJUSTMENT

[75] Inventor: Walter Runkel, Wuppertal, Fed. Rep. of Germany

[73] Assignee: Hermann Hemscheidt Maschinenfabrik GmbH & Co., Fed. Rep. of Germany

[21] Appl. No.: 560,611

[22] Filed: Aug. 1, 1990

[30] Foreign Application Priority Data

Aug. 2, 1989 [DE] Fed. Rep. of Germany ....... 3925520

[51] Int. Cl.⁵ .................... F16K 15/14; F16K 17/18
[52] U.S. Cl. ............................ 137/493.8; 137/512.15; 137/524; 137/855; 188/299; 188/322; 188/14
[58] Field of Search ............. 137/493.8, 512.15, 523, 137/524, 855, 857; 188/299, 319, 322.14

[56] References Cited

U.S. PATENT DOCUMENTS

| 2,193,123 | 3/1940 | Des Roches | 137/855 X |
|---|---|---|---|
| 2,335,907 | 12/1943 | Boor et al. | 188/319 |
| 2,637,519 | 5/1953 | Ferrari | 137/857 |
| 2,748,898 | 6/1956 | Bourcier de Carbon | 137/493.8 X |
| 3,256,960 | 6/1966 | Casimir | 188/299 |
| 4,098,296 | 7/1978 | Grasso et al. | 137/855 |
| 4,645,044 | 2/1987 | Kato et al. | 188/319 |
| 4,653,617 | 3/1987 | Casimir et al. | 188/299 X |

FOREIGN PATENT DOCUMENTS

| 1270426 | 6/1968 | Fed. Rep. of Germany . |
|---|---|---|
| 1817318 | 7/1970 | Fed. Rep. of Germany . |
| 1817392 | 7/1970 | Fed. Rep. of Germany . |
| 7104268 | 11/1972 | Fed. Rep. of Germany . |
| 8026458 | 1/1981 | Fed. Rep. of Germany . |
| 3522105 | 1/1986 | Fed. Rep. of Germany . |
| 59-197639 | 11/1984 | Japan . |
| 1150394 | 4/1969 | United Kingdom . |
| 2170572 | 8/1986 | United Kingdom . |

Primary Examiner—Stephen M. Hepperle
Attorney, Agent, or Firm—Jones, Askew & Lunsford

[57] ABSTRACT

The invention pertains to a damping valve(1), especially for hydraulic media in damping systems, such as shock or vibration damping systems and the like, with at least one throttling channel (38) equipped with a valve element for damping adjustment. The valve element at least partially covers the outlet mouth (40) of the throttling channel (38) and is designed as a leaf-spring element (42) clamped at one end, while the damping adjustment is accomplished by varying the length (1) of the free end of the leaf of the leaf-spring element (42).

8 Claims, 4 Drawing Sheets

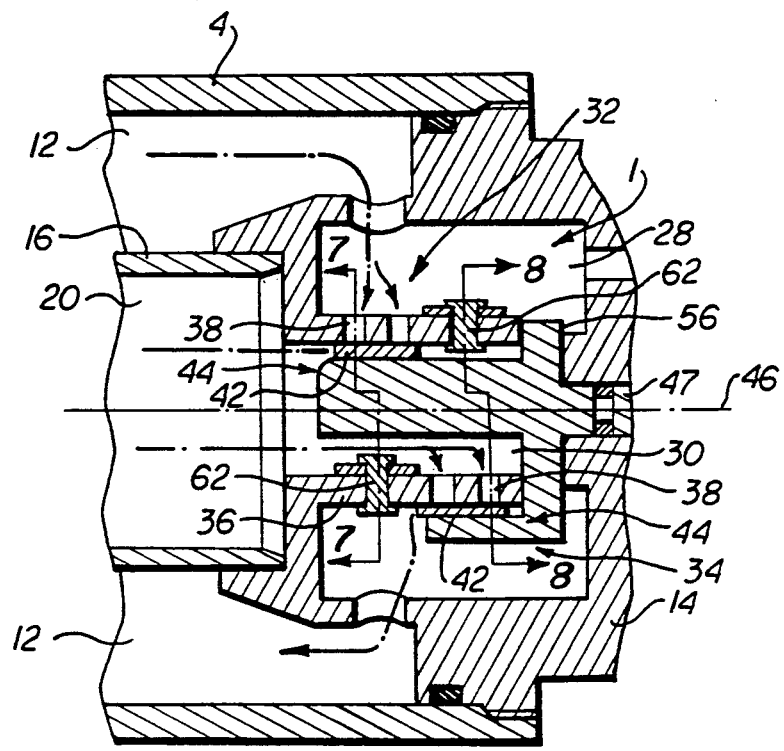
FIG 6
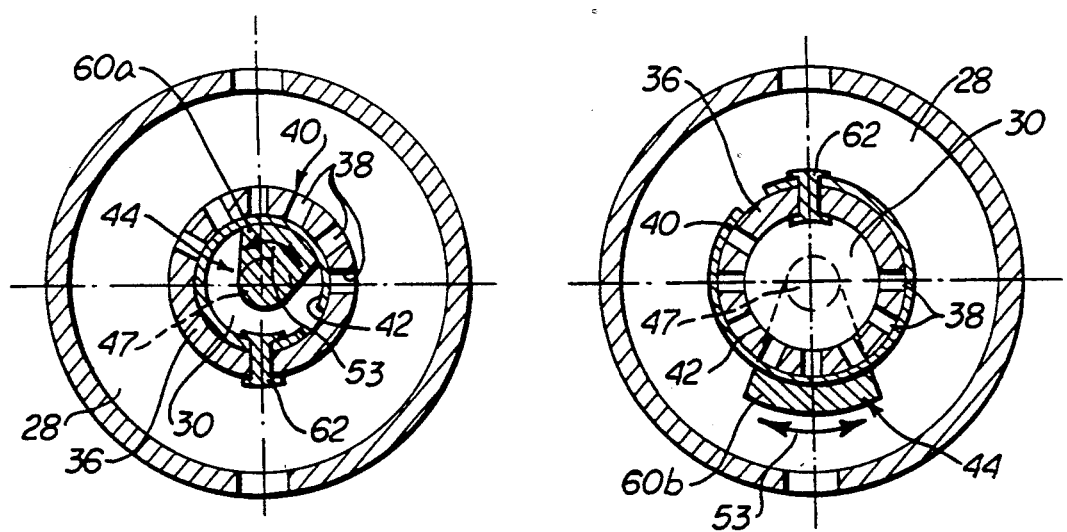
FIG 7  FIG 8

DAMPING VALVE WITH IMPROVED DAMPING ADJUSTMENT

The present invention pertains to a damping valve, especially for hydraulic media in damping systems, such as shock and vibration damping systems and the like, with at least one throttling channel equipped with a valve element for damping adjustment.

A shock and vibration damping system is known from German Patent (Offenlegungsschrift) No. 3,613,677. In this system, a piston with a hollow cylindrical piston rod rides in a cylinder of a hydropneumatic piston-cylinder unit. Inside the piston rod, a freely movable separating piston separates a compensation space for a hydraulic medium from a gas reservoir filled with a compressible medium. The piston has a passage consisting of several throttling channels, through which the hydraulic medium flows from a cylinder chamber into the compensation space or vice versa during movement of the piston. The medium flowing into the compensation space then effects a compression, and therefore a spring action, in the gas reservoir. In the passage of the piston between the cylinder chamber and the compensation space, a damping valve arrangement is provided, by means of which a damping of the spring action or the flow of the hydraulic medium is achieved. This damping valve arrangement consists of two separate, generic damping valves, one of which damps the inward spring-action flow, while the other damps the outward spring-action flow. However, a decided disadvantage of this known arrangement is the fact that, following an initial setting during the manufacture of the piston-cylinder unit, the damping action is rigidly fixed, i.e., can no longer be changed. Consequently, a "dynamic adjustability" is also not possible during the operation of a given damper.

Accordingly, the goal of the invention is the creation of a damping valve of the aforesaid general type, which, with constructively simple and therefore cost-effective means, ensures the possibility of easy and efficient, preferably also "dynamic," adjustment of the damping action with good damping characteristics.

In keeping with the invention, this is realized by way of a valve element designed as a leaf-spring element, which is secured at one end in such a way that it at least partially covers the mouth of the throttling channel for the medium, while the damping adjustment is accomplished by varying the length of the free end of the leaf of the leaf-spring element.

Therefore, the damping action is achieved in keeping with the invention, in that the damping medium flowing through the throttling channel contacts the lamella-like leaf-spring element extending over the mouth of the channel and imparts opening force to it, whereupon the leaf-spring element, depending upon the set length of its leaf and therefore upon its spring power at the time, bends more or less in the opening direction thus providing a more or less large flow or throttling opening. It is also possible, in keeping with the invention, to effect an adjustment, in which the free length of the spring—in relation to the throttling channel-is equal to zero, so that the leaf-spring element completely closes the throttling channel. Accordingly, it is possible, with the device of the invention, to effect an especially uninterrupted adjustment of the damping action from minimal damping, determined by maximal leaf length and the constant spring-action data of the leaf-spring element, to maximal damping with the flow equal to zero(blocking). Adjustment of the damping can be advantageously realized with especially simple means. On this point, attention is invited to the embodiment examples described in the ensuing discussion of the appended figures.

Figure 2:
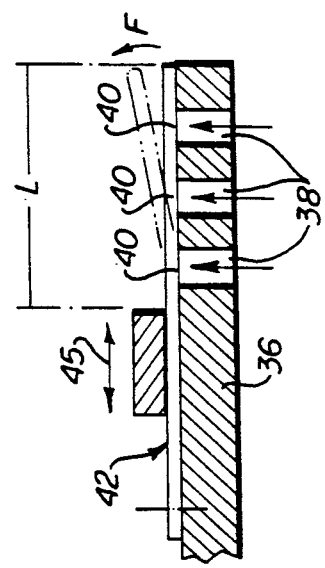
Figure 3:
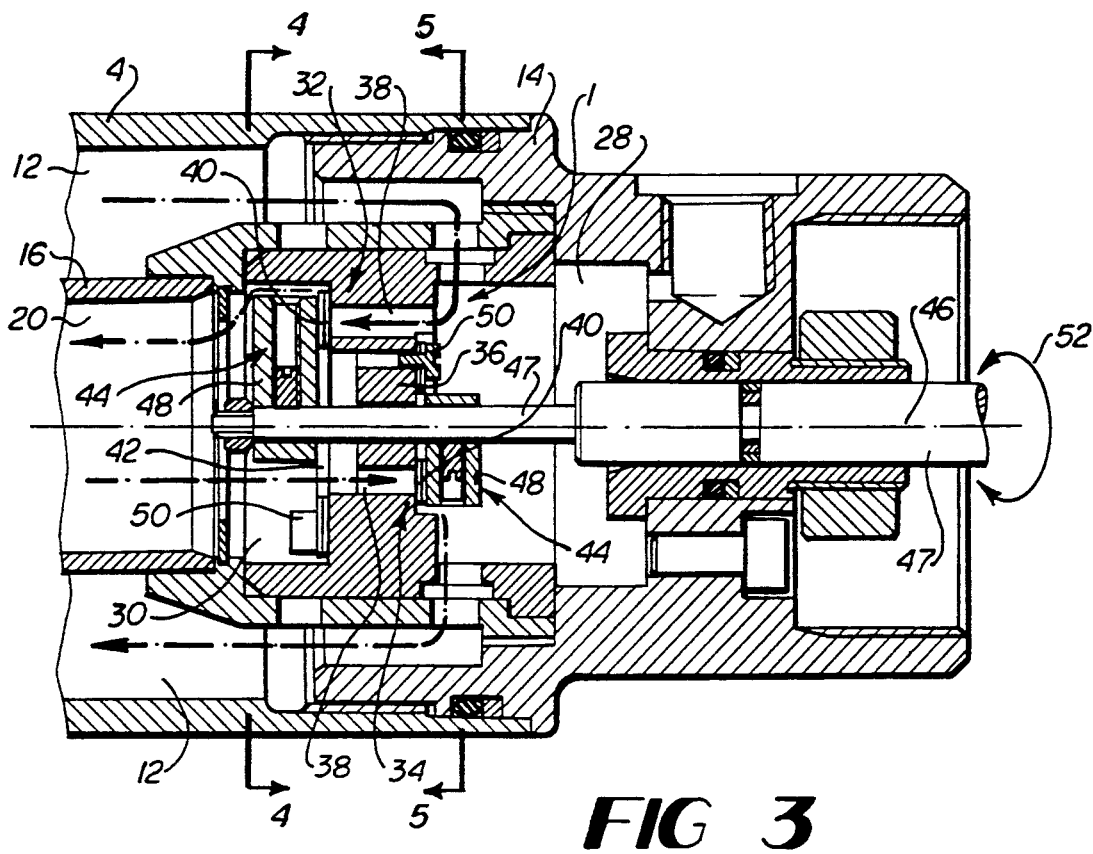
Figure 4:
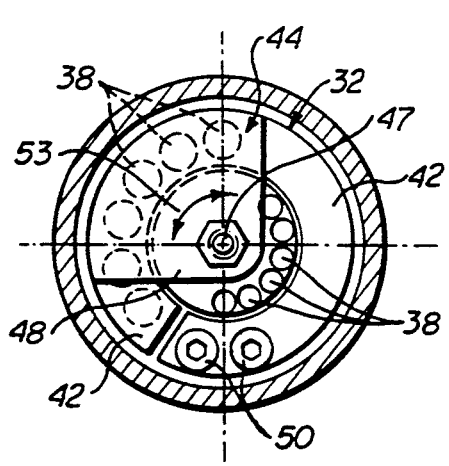
Figure 5:
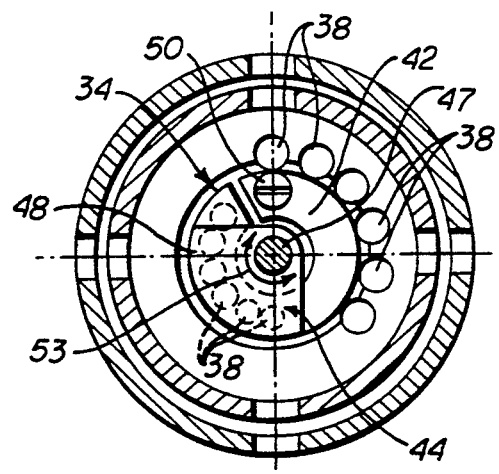
Figure 9:
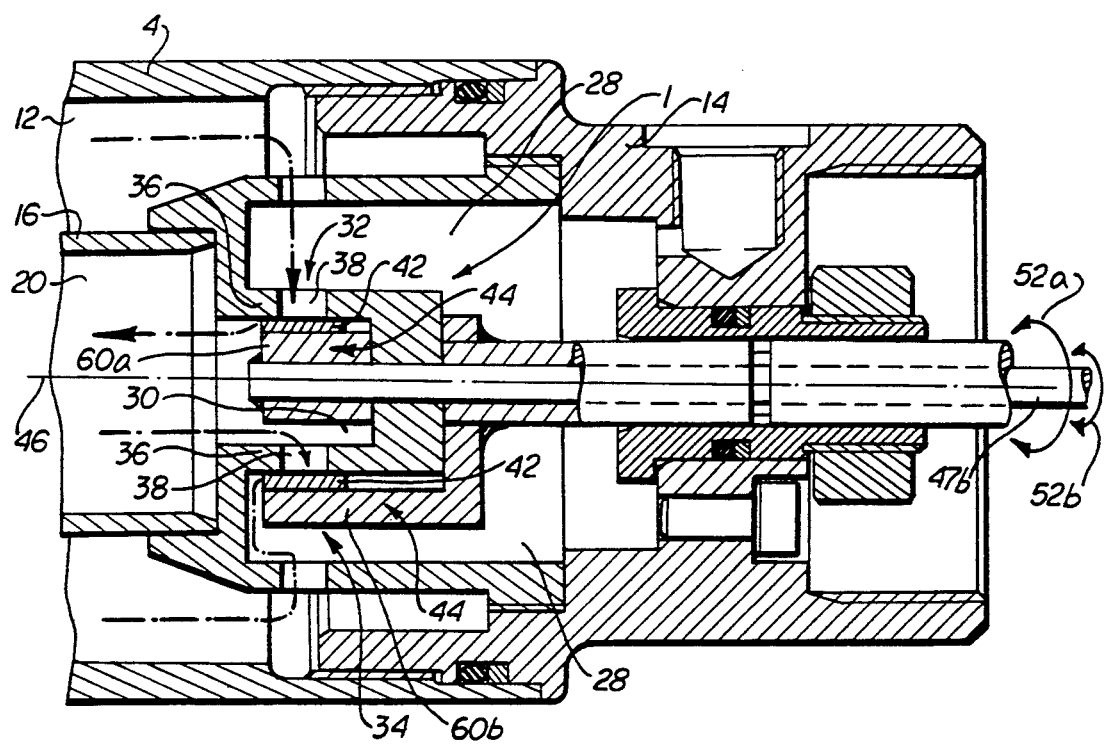

By way of several embodiment examples, the invention is described in greater detail below. The appended figures depict:

FIG. 1, an axial cross section through a hydropneumatic piston-cylinder unit with a damping valve arrangement in keeping with the invention;

FIG. 2, for purposes of exemplifying the function in principle, a sectional depiction of a highly simplified embodiment of a damping valve in keeping with the invention;

FIG. 3, a sectional enlargement of the area (X) of the damping valve illustrated in FIG. 1;

FIG. 4, a cross section along the line 4—4 in FIG. 3;

FIG. 5, cross section along the line 5—5 in FIG. 3;

FIG. 6, in presentation analogous to that of FIG. 3, an axial cross section through an alternative embodiment form of a damping valve arrangement in keeping with the invention;

FIG. 7, a cross section along the line 7—7 in FIG. 6;

FIG. 8, a cross section along the line 8—8 in FIG. 6;

FIG. 9, in axial cross section, another alternative of a damping valve arrangement in keeping with the invention.

In the various drawings, identical parts are always marked with the same reference numbers.

In the embodiment example depicted in FIG. 1, a damping valve arrangement (1) is positioned within a hydropneumatic piston cylinder unit (2). However, equally within the purview of the invention, the damping valve of the invention can also be designed as a separate component connected via lines with a damping system of choice, including, e.g., guide dampers and the like. In the depicted example, the piston-cylinder unit (2) consists of a cylinder (4) and a piston (6) contained therein, which piston is joined to a piston rod (8). The piston rod (8), appropriately sealed, extends out of one end of the cylinder (4). Inside the cylinder (4), the piston (6) separates two chambers (10), (12) filled with a hydraulic medium. The piston rod (8) is hollow cylindrical and the piston (6) is annular. Inside the cylinder (4), an interior tube (16) is coaxially affixed to a head part (14) facing away from the open end of the cylinder (4), which extends with minimal play through the annular piston (6) and into the hollow cylindrical piston rod (8). Thus, the piston (6) encloses, with minimal peripheral play, the interior tube (16) within an annular cylinder space formed between the tube and the cylinder (4). By virtue of this design( the chambers (10), (12) separated by the piston (6) are annular chambers. The piston-cylinder unit (2) thus designed, has a high degree of stability for absorbing extremely high transverse forces, since the inner wall of the hollow cylindrical piston rod (8) is advantageously guided on the outer jacket of the interior tube (6) throughout the entire stroke of the annular piston (6).

Inside the interior tube (16), there is also a freely movable, i.e., floating, separating piston (18). This piston (18) separates a compensation space (20), which is situated on the side facing the head part (14) and filled with the hydraulic medium, from a gas chamber (22), which functions as a pneumatic spring, on the other side of the separating piston (18). This gas chamber is filled with an elastically compressible medium, e.g., air, optionally under overpressure acting as a preliminary charge.

The piston (6) has at least one flow channel (24) connecting the chambers (10), (12), as well as, preferably, a damping valve arrangement (26) for damping or throttling the flow between the chambers (10), (12). This damping valve arrangement (26) is not, however, part of the present invention, for which reason its configuration is not herein further described.

The damping valve arrangement (1) of the invention is then preferably located at the transition between the cylinder chamber (12) and the compensation space (20) in the vicinity of the head part (14) and has, in all of the embodiment examples, a first valve chamber (28) associated with the cylinder chamber (12) and a second valve chamber (30) associated with the compensation space (20) and providing immediate access to said compensation space (20). This damping valve arrangement (1) preferably consists of two individual damping valves, i.e., an input damping valve (32) for damping the inward directed, spring-action flow from the cylinder chamber (12) into the compensation space (20) and an output damping valve (34) for damping the outward directed spring-action flow from the compensation space (20) into the cylinder chamber (12). The two valve chambers (28), (30) are separated by a partition (36), while at least one throttling channel (38) for each damping valve (32), (34) extends through this partition (36). Each of these throttling channels (38) is equipped with a valve element for regulating the damping action.

As shown in simplified form in FIG. 2, the valve element, is designed as a leaf-spring element (42), which is attached at one end and closes the outlet aperture (40) of the throttling channel (38), in the depicted example each of several throttling channels (38), for the hydraulic medium. Accordingly, adjustment of the damping action is accomplished in keeping with the invention by varying the free length of the leaf or the clamped length (1) of the leaf-spring element (42). To this end, an adjustable contact element (44) is provided, which, in a practical manner, follows in each case along the leaf-spring element (42) (see the double arrow (45) in FIG. 2), so that the leaf-spring element (42) is clamped between the partition (36) and the pressure element (44) with a variable length (1). This also results in alteration of the spring force (F) of the leaf-spring element (42), which must be applied by the medium flowing through the flow channels (38) to open the flow channels (38) by bending the leaf-spring element (42) into the position indicated in broken outline in FIG. 2. This makes it possible to regulate very precisely and especially uninterruptedly the damping or throttling action by varying the cross-sectional open flow. It is also desirable that element (44) be so designed that it can be positioned throttling channels (38), so that the latter can also be completely closed.

The embodiment examples depicted FIGS. 3-9 are described in detail below.

In the embodiment shown in FIGS. 3-5, the damping valves (32), (34) of the damping valve arrangement (1) of the invention are designed with axial flow. In this design, the partition (36) between the first valve chamber (28) and the second valve chamber (30) is perpendicular to the longitudinal axis (46) of the piston cylinder unit, and for each damping valve (32, 34) several throttling channels (38) extend axially through the partition (36). In each case, the throttling channels (38) are arranged in a circle concentric to the longitudinal axis (46) in such a way that the throttling channels (38) of the one damping valve (32) are in an outer circle and the throttling channels (38) of the other damping valve (34) are in an inner circle (or vice versa) (see FIGS. 4 and 5 in particular). The throttling channels (38) of the damping valves (32, 34) are, in each case in this embodiment form, covered by a leaf-spring element (42) designed as part of a planar, annular plate or a complete, albeit radially slotted, annular plate, which, in each instance is located on the side from which the hydraulic medium, after passage of the throttling channels (38), emerges, i.e., on the side of the outlet mouths (40). A central, axial shaft (47), sealed off from the outside and extending through the head part (14) of the piston-cylinder unit (2), bears the contact element (44) for each damping valve (32), (34), while, in this case, each contact element (44) is designed as a radial contact piece (48), which is rotatable or pivotable together with the shaft. As depicted in FIGS. 4 and 5, each such contact piece (48) covers an angular area of about 90°. As further illustrated in FIGS. 4 and 5, each annular, plate-like leaf-spring element (42) is affixed to the partition (36) with screws (50), while its free, spring-action section spans the area between the partition (36) and the associated contact piece (48). By rotating the shaft (47), by means of its outward projecting operating end, in the direction of the double arrow (52) (FIG. 3), a common displacement of both contact pieces (48) in the direction of the double arrow (53) (FIGS. 4 and 5) is effected, which results in variation of the clamped length (1) and thus in the damping adjustment in keeping with the invention. Also illustrated in FIG. 3 is the fact that the leaf-spring element (42) in keeping with the invention can also be multiply-layered consisting of at least two parallel, superimposed individual leaf springs. This results, at the same thickness, in a "softer" spring, since the individual leaf springs can displace against each other in the bending movement. FIG. 3 also includes broken line arrows, which are intended to indicate the direction of flow, on the one hand, during inward directed damping via the input-damping valve (32), and on the other hand, during the outward directed throttling via the output damping valve (34).

In another advantageous refinement of the invention not illustrated in FIGS. 3-5, pressure equalization is provided for between each contact element (44) and the associated leaf-spring element (42), so that the pressure of the hydraulic medium is equal on both axial sides of the contact element (44). This can be advantageously realized by providing spacer elements at the side of each contact element (44) facing the leaf-spring element (42), such as radial resting stays in particular, which clamp the leaf-spring element (42) together with the partition (36). The hydraulic medium can then penetrate between the spacer elements, the leaf spring element (42), and the contact element (44). This makes it possible to adjust the damping action easily even under operating conditions, i.e., dynamically, by actuating the contact elements (44).

In the embodiment example shown in FIGS. 6-8, the damping valves (32), (34) of the damping valve arrangement (1) of the invention are designed with radial flow. To this end, the partition (36) between the first valve chamber (28) and the second valve chamber (30) is designed as a hollow cylindrical wall, through which the throttling channels (38) extend in a radial direction (see FIGS. 7 and 8 in particular). In this case, two axially offset rows of peripherally spaced throttling channels (38) are provided for each of the damping valves (32), (34). Here as well, all of the throttling channels (38) of each damping valve (32), (34) are covered by the leaf-spring element (42) on the side of the outlet opening (40), to which end each leaf-spring element (42) is annularly or hollow cylindrically curved to match the diameter or the curvature of the partition (36) in such a way that it lies over its entire longitudinal extension against the partition (36) under a certain pretension. Beginning at a section of the headpiece (14) holding the interior tube (16), the hollow cylindrical partition (36) extends axially away from the interior tube (16) and has a frontal, annular end surface (56) on its side facing away from the interior tube (16). In this case, the contact elements (44) joined with the shaft (47) are designed as a plate (58) joined to the shaft (47), ordered perpendicular to the longitudinal axis (46), preferably sealed at the end surface (56) of the hollow cylindrical partition (36), and extended axially as contact pieces (60a), (60b) in the direction of the damping valves (32), (34) and the interior tube (16), while the pressure piece (60a) of the input damping valve (32) extends into the interior of the hollow cylindrical partition (36) and there makes contact, via its radially outward-projecting surface matched to the curvature of the leaf-spring element (42), with said leaf-spring element (42) and thus clamps the latter radially between itself and the partition (36). The contact piece (60b), on the other hand, extends axially on the outside of the hollow cylindrical partition and over the associated leaf-spring element (42) and also has a radially inward directed surface matched to the curvature of said leaf-spring element (42), between which the partition (36) and the leaf-spring element (42) are clamped. In FIG. 6, it is apparent that both damping valves (32), (34), i.e., their respective throttling channels (38), and the associated leaf-spring elements (42) are axially offset in relation one to the other. For this reason, the contact piece (60a) in the depicted example is designed longer than the other contact piece (60b). This offset of the damping valves (32), (34) can, however, be just as well reversed. In this example, each of the leaf-spring elements (42) is affixed to the partition (36) at one end by means of rivets (62). Here as well, adjustment of the damping action is accomplished by rotating the shaft (47), whereupon both contact pieces (60a), (60b) are displaced along the longitudinal extension of the leaf-spring elements (42), so that their clamped length and thus their spring-action force are altered.

In the embodiment examples illustrated in FIGS. 3–5 and FIGS. 6–8, the contact elements (44) of both damping valves (32), (34) are mutually joined to the same shaft (47), so that simultaneous regulation of both inward and outward spring-action damping is possible.

Contrarily, in the embodiment example illustrated in FIG. 9, the two damping valves (32), (34) of the damping valve arrangement (1) in keeping with the invention, can be independently adjusted. To this end—again in a radial flow version similar to that depicted in FIGS. 6–8—each contact element (44) is joined to its own partial shaft (47a), (47b). The one partial shaft (47a) is of hollow cylindrical design and the other partial shaft (47b) extends axially through the hollow cylindrical partial shaft (47a). This permits adjustment of the inward directed damping valve (32) by rotation of the inner shaft (47b) in the direction indicated by the double arrow (52b) and adjustment of the outward directed damping valve (34) by rotating the outer partial shaft (47a) in the direction indicated by the double arrow (52a). The throttling channels (38) of both of the individual damping valves (32), (34) are, in this embodiment, offset in the circumferential direction of the partition (36). Otherwise, the embodiment shown in FIG. 9 corresponds—with minor differences—with that depicted in FIGS. 6–8, while identical parts are indicated by identical reference numbers. Naturally, the version with axial flow as illustrated in FIGS. 3–5 can also be designed, analogously with FIG. 9, with independently adjustable damping valves (32), (34).

The invention is not restricted to the embodiment examples illustrated and described, rather it encompasses all embodiment variants functioning in the sense of the invention.

I claim:

1. Damping valve for hydraulic media in damping systems, such as shock and vibration damping systems and the like, comprising:

plural throttling channels equipped with a valve element for damping adjustment, each throttling channel having an aperture;

said valve element comprising a leaf-spring element (42) which is secured at one end in such a way that the leaf-spring element covers the apertures (40) of the throttling channels (38) for the medium while the damping adjustment is accomplished by varying the length of the free end of the leaf-spring element;

said several throttling channels (38) extend through a partition (36) separating a first valve chamber (28) from a second valve chamber (30);

a pressure element (44) for varying the length (1) of the free end of the leaf spring element (42) affixed at one end to the partition (36);

said pressure element (44) is movably guided over said leaf-spring element, while the leaf-spring element (42) is clamped between the pressure element (44) and the partition (36);

said partition (36) being of planar design and the throttling channels (38) being arranged axially parallel to each other and spaced in an arc;

the leaf-spring element (42) is a planar, radially slotted, annular plate covering the throttling channels (38); and the pressure element (44) is a radial pressure piece (48) affixed to a rotatably mounted shaft (47) perpendicular to the partition (36) and by means of said shaft (47), pivotable over the annular leaf-spring element (42), so as to vary the length of the free end.

2. Damping valve according to claim 1, characterized by the fact that the length (1) of the leaf of the leaf-spring element (42) is uninterrupted variable between a maximum value and, in relation to the throttling channel (38), a length equal to zero.

3. Damping valve according to claim 1, characterized by the fact that a pressure equalization is created between the contact element (44) and the leaf-spring element (42) in such a way that the pressure of the hydraulic medium, is identical on both sides of the contact element (44).

4. Damping valve according to claim 1, characterized by the fact that, in the area of its free leaf length (1), the leaf-spring element (42) contacts the partition (36) under pretension.

5. Damping valve according to claim 1, characterized by the fact that the leaf-spring element (42) comprises at least two superimposed individual leaf springs.

6. Damping valve arrangement for hydraulic media in damping systems, characterized by two damping valves (32), (34) according to claim 1, which operate in opposite directions in relation to the direction of flow of the medium flowing through the throttling channels (38).

7. Damping valve arrangement according to claim 6, characterized by the fact that the damping valves (32), (34) are operative for adjustment either together or independently of one another.

8. Damping valve arrangement according to claim 6 or 7, characterized by the fact that both damping valves (32), (34) have a common first valve chamber (28), a common second valve chamber (30), and a common partition (36) separating the two valve chambers (28), (30), a row of several throttling channels (38) for each damping valve (32), (34) extends through the partition (36), both rows of throttling channels (38) are covered on different sides of the partition (36) by a leaf-spring element (42), and the leaf-spring elements (42) together with their associated throttling channels 38 are offset one from the other in either the axial or peripheral directions.

* * * * *